July 29, 1969 C. D. MURDOCH ET AL 3,458,191

TETHERED PIN STATUS SENSING ARRANGEMENT

Original Filed June 1, 1965 8 Sheets-Sheet 1

INVENTORS
COLIN D. MURDOCH
CHAD W. PENNEBAKER
By [signature]

July 29, 1969 C. D. MURDOCH ET AL 3,458,191

TETHERED PIN STATUS SENSING ARRANGEMENT

Original Filed June 1, 1965 8 Sheets-Sheet 5

July 29, 1969 C. D. MURDOCH ET AL 3,458,191

TETHERED PIN STATUS SENSING ARRANGEMENT

Original Filed June 1, 1965 8 Sheets-Sheet 6

United States Patent Office 3,458,191

Patented July 29, 1969

3,458,191

TETHERED PIN STATUS SENSING ARRANGEMENT

Colin D. Murdoch, Walnut Creek, and Chad W. Pennebaker, San Leandro, Calif., assignors to National Bowling Corporation, Oakland, Calif., a corporation of California Original application June 1, 1965, Ser. No. 460,133. Divided and this application Mar. 18, 1968, Ser. No. 721,536

Int. Cl. A63d 5/04

U.S. Cl. 273—44 5 Claims

ABSTRACT OF THE DISCLOSURE

In pin setting apparatus for bowling lanes, of the type having pins suspended from cords, a pin-position-sensing arrangement comprising a roller above the area of the bowling lane where a pin is to be set up, a drive cord for the pin having a horizontal run extending above said roller, a pin-supporting cord trained over said roller and having a pin suspended from its lower end, a tubular housing located on one side of said drive cord run at a point remote from said roller and having a circular opening in the side facing said run at a level below said run, a switch located in said housing and having a resiliently yieldable actuating arm disposed adjacent to and extending across said opening, a post located on the opposite side of said run, and a sphere held in said opening between said post and said actuating arm, said pin-supporting cord extending between said post and said housing below and loosely around said sphere on the side thereof adjacent said post and having its upper end connected to said drive cord run at a point above said roller when said drive cord is in its initial position with its pin located upon its proper area of the bowling lane. Thus, whenever the pin suspended from the supporting cord is knocked over by a ball and the supporting cord is pulled downwardly as a result thereof, it forces its way through the space between the post and the ball and actuates the arm of the switch through said ball, thus indicating that the pin has been knocked over.

This application is a division of our copending application, Ser. No. 460,133, filed June 1, 1965, and now abandoned.

The present invention relates to pin-setting apparatus for use on bowling alleys to eliminate the necessity of employing pin boys for removing fallen pins and for setting up the pins for a new frame. More particularly, the present invention relates to pin-setting apparatus of the type wherein the fallen pins are removed and are reset by manipulation of resetting cords or cables that are attached to the tops of the pins.

Apparatus of this type are usually arranged to lift both the fallen and the standing pins above the floor of the bowling lane after the first ball has been played, and to reset those that were left standing but hold the "fallen" pins sufficiently high above the floor to keep them out of reach of the second ball; and after the second ball has been played, such apparatus operate to lift all the remaining pins above the target area and to lower all the pins into their proper positions for the next frame of the game.

It is an object of the present invention to provide a pin-setting apparatus of the type referred to, that is of less complexity and cost of construction than conventional pin-setting apparatus of related types.

More specifically, it is an object of the invention to provide simple and dependably operating means for sensing whether a pin has fallen.

These and other objects of the present invention will be apparent from the following description of the accompanying drawings which illustrate a preferred embodiment thereof and wherein.

The pin-setting apparatus of the invention comprises a horizontally disposed deck 10 that is suitably supported by four legs 12 above the target area at the end of a bowling lane. Upon said target area ten bowling pins 16 may be set up in the conventional triangular pattern as shown in FIGURE 1.

Figure 10A:
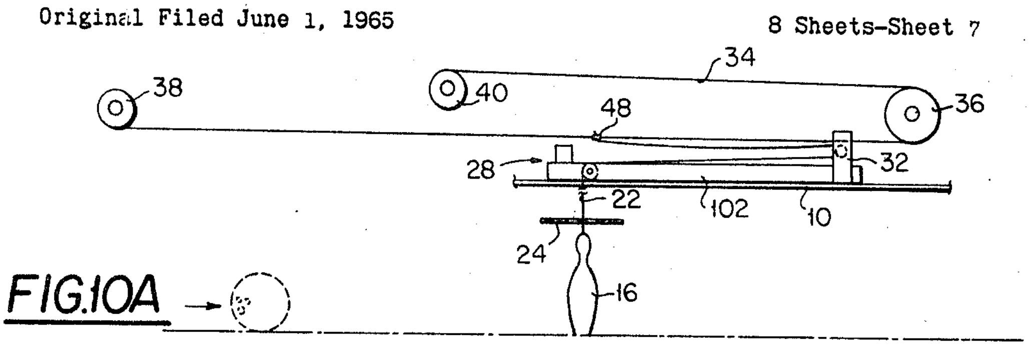
FIGURES 10A, 10B and 10C are schematic representations of a pin actuating cord and the pin suspended therefrom and illustrate different operational positions thereof.
Figure 10B:
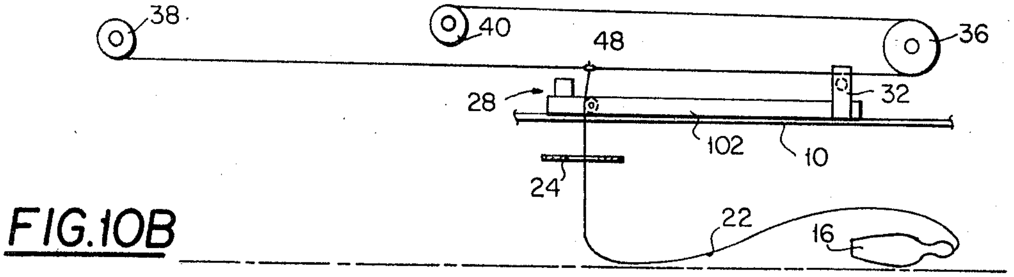
Figure 10C:
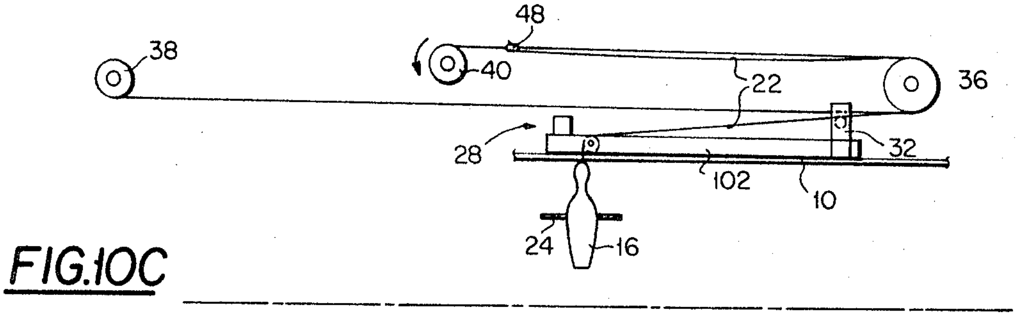

At its upper end each pin is suitably secured to a cord or cable 22, and when the pin is set up in its proper position upon the floor of the target area, its cord passes upwardly through a pin-centering device 24 (FIGURE 3) which is located above the pin and below the deck, and through an aperture 26 in said deck (FIGURE 2) that is vertically aligned with the center point of the floor area upon which the pin rests in its proper position. Above the deck the pin-supporting cord passes through a pin-retaining mechanism that is supported upon the deck and which is collectively identified by the reference numeral 28 (FIGURE 3) and thereafter it is looped around the sphere-shaped actuator 30 of a pin-position-sensing switch 32 that is likewise supported upon the deck 10. Beyond the pin-position-sensing switch 32 the upper end of the cord 22 is secured to a drive or actuator cord 34. Said actuator cord is trained around an idler drum 36 that is disposed transversely of the deck 10 and is rotatably supported at the rear thereof. One end of the actuator cord is wound in a clockwise direction as viewed in FIGURES 2 and 3, upon a transversely disposed drum 38 that is rotatably supported from the deck 10 adjacent the front end thereof, and is suitably anchored in said drum; and the opposite end of said cord is wound in a counter-clockwise direction upon yet another transversely disposed drum 40 that is likewise rotatably supported from the deck 10 at an intermediate area thereof. The drums 38 and 40 are connected for rotation in unison, and for this purpose they are provided with sprockets 42 and 44 respectively, around which is trained a sprocket chain 46. Whenever the drums 38 and 40 are turned in a counter-clockwise direction, as viewed in FIGURES 3 and 10, the drum 40 acts as a drive reel and the drum 38 acts as a supply reel, i.e. the drive or actuator cord 34 is wound upon the drum 40 and is unwound from the drum 38, and the connection 48 of the pin-supporting cord 22 with the actuator cord 34 is pulled away from the aperture 26 in the deck 10 and ultimately raises its pin 16 above the floor of the target area (FIGURE 10C). Alternatively, when the drums 38 and 40 are turned in a clockwise direction, the drum 38 acts as a drive reel and the drum 40 acts as a supply reel, and the connection 48 of the cords is brought closer to the aperture 26 in the deck 10, which is effective to lower a raised pin and to provide a length of loose cord for each pin (FIGURE 10A).

Figure 1:
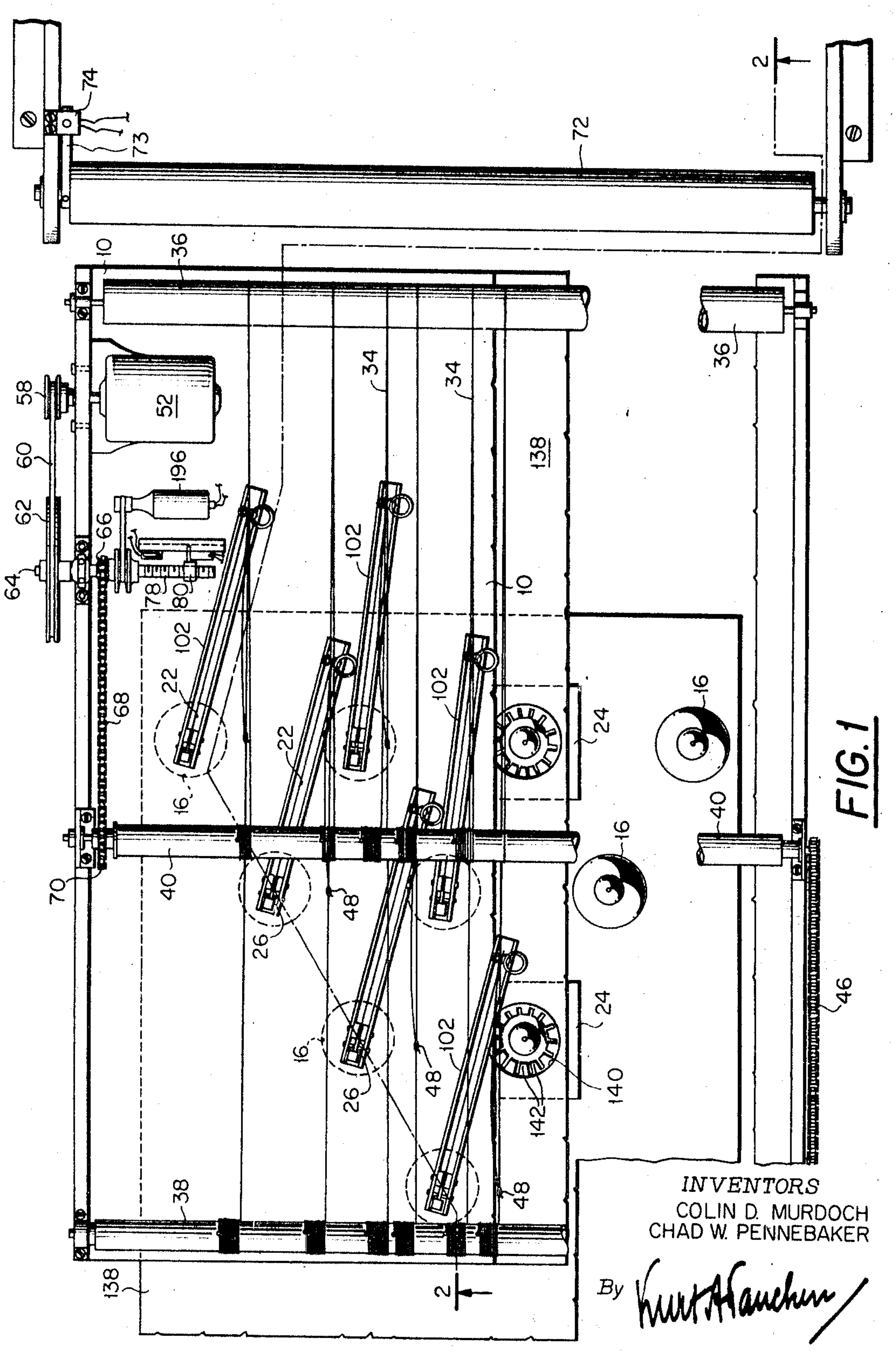
FIGURE 1 is a fragmentary plan view of a pin-setting apparatus embodying the present invention.
Figure 2:
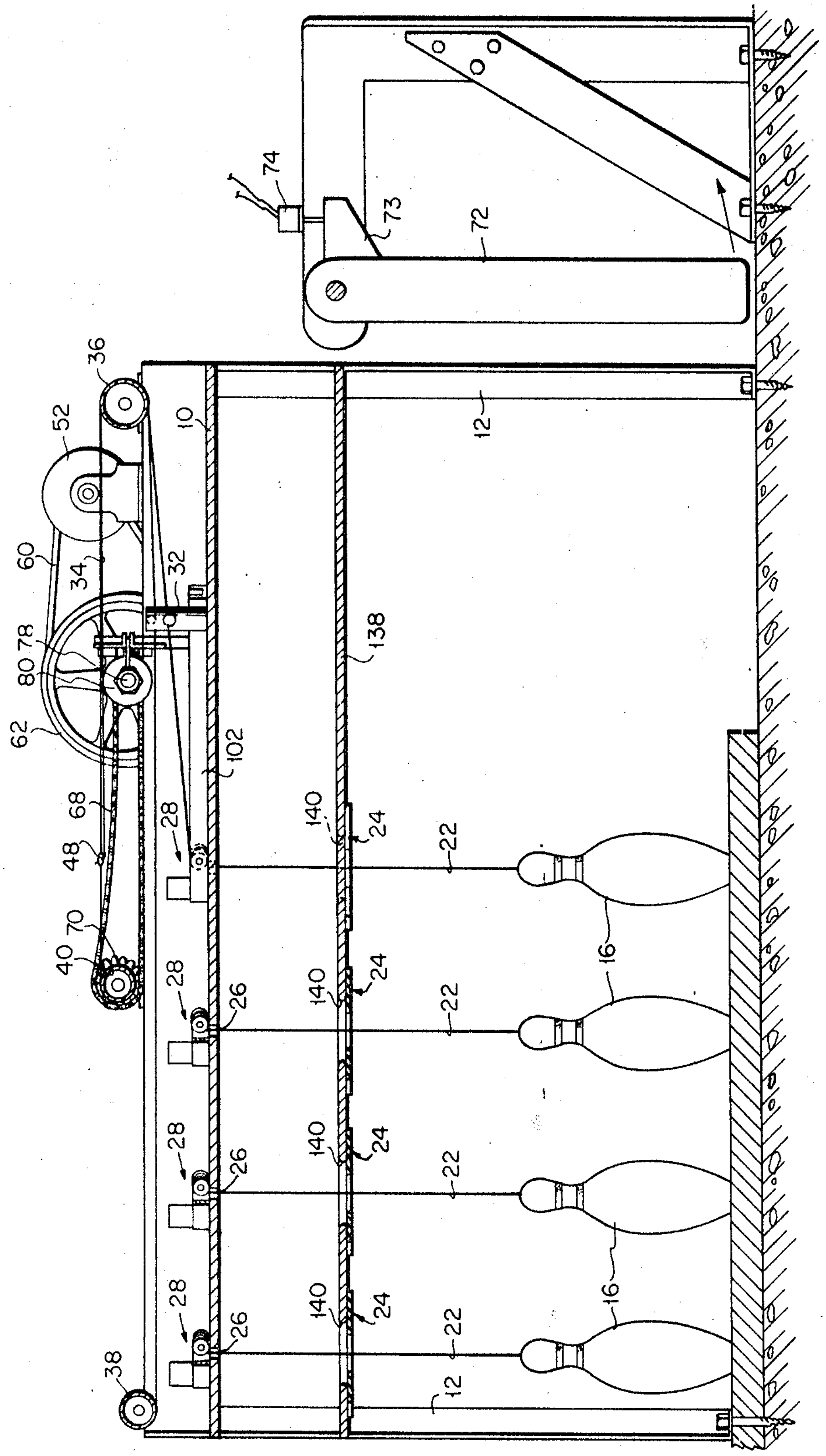
FIGURE 2 is a side elevation of a section through the pin-setting apparatus taken along line 2—2 of FIGURE 1 and viewed in the direction of the arrows associated with said line.

As previously pointed out, and as shown in FIGURES 1 and 2, every single one of the pins comprised in the apparatus of the invention has a supporting cord 22 attached to its upper end, which passes through an appropriately placed aperture 26 in the deck 10, and every one of said pin-supporting cords has its upper end tied to an actuator or drive cord 34; and all the actuator cords comprised in the apparatus of the invention are trained around the idler drum 36 and have their opposite ends wound upon, an anchored in, the drive drums 38 and 40, respectively.

Figure 3:
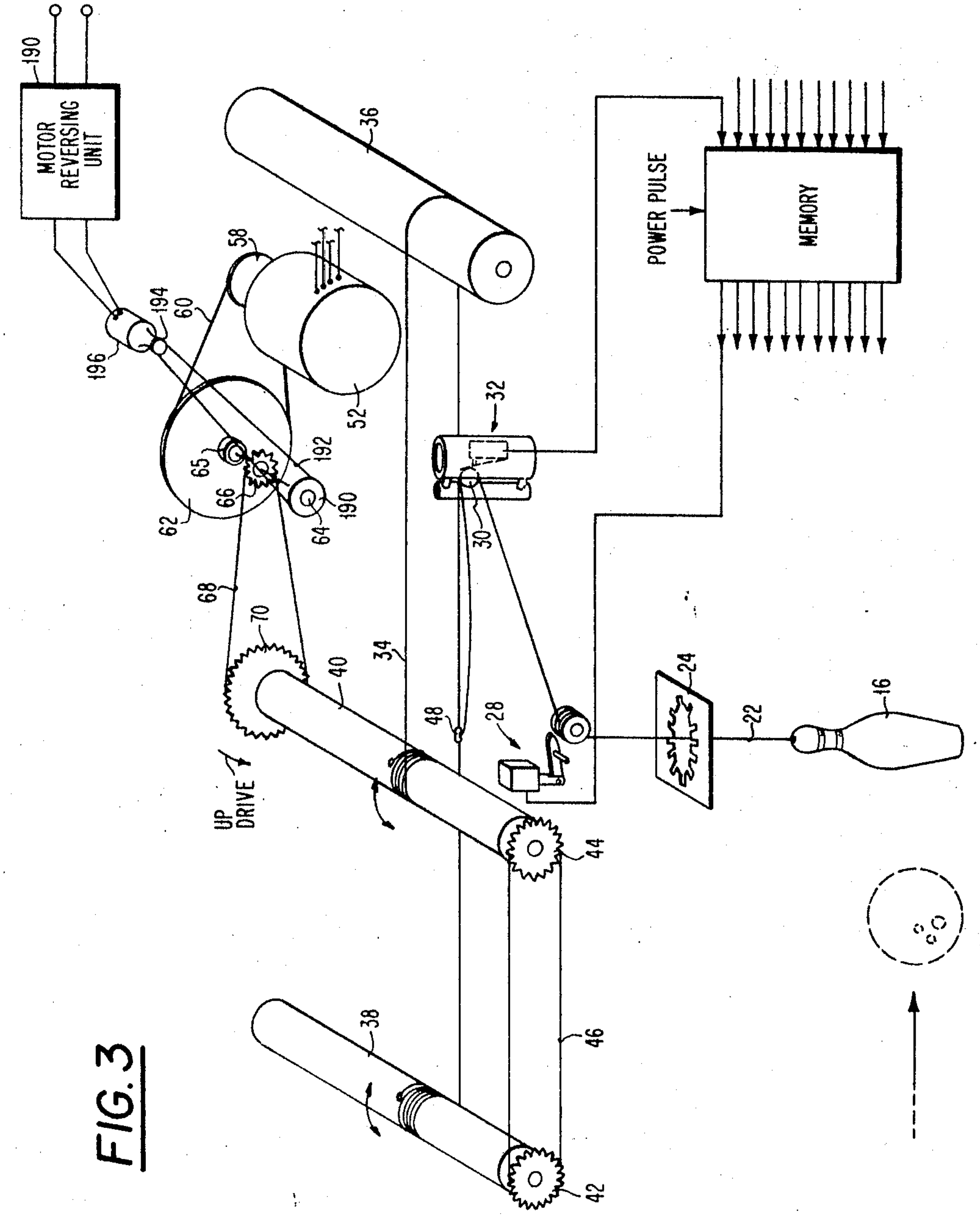
FIGURE 3 is a schematic perspective of the actuator train for one of the pins comprised in the apparatus of the invention.

To selectively drive the drums 38 and 40 in either direction, a two-directional motor 52 is mounted upon the deck 10 (FIGURES 1 and 3). The output shaft of said motor is arranged parallel to the drums 36, 38 and 40, and secured to said shaft is a pulley 58 which is operatively connected by an endles belt 60 to a pulley 62 of substantially larger diameter. The pulley is releasably secured by a slip clutch 65 to another shaft 64 that is rotatably supported from the deck 10 in a position parallel to the output shaft of the motor 52. Said shaft 64 carries firmly secured thereto a small diameter sprocket 66; and said sprocket 66 is operatively connected by a sprocket chain 68 with another sprocket 70 of substantially larger diameter which is secured to a shaft that drives the drum 40.

Pivotally supported behind the rear legs of the frame is a rotatably supported swinging gate (FIGURES 1 and 2) provided with a rearwardly directed arm 73, and upon impact of the ball against the said gate the arm 73 is arranged to actuate a switch 74 to initiate operation of the motor 52 in counter-clockwise direction as viewed in FIGURES 2, 3 and 4, after a predetermined period of time has elapsed as will be described in greater detail hereinafter. Hence, whenever a ball has been thrown and has hit the gate 72, the motor commences to operate in a counter-clockwise direction after sufficient time has elapsed for any tottering pins to fall; and as the drums 40 and 38 turn in counter-clockwise direction, all the drive cords 34 secured to said drums are unwound from drum 38 and are wound upon drum 40, and move the upper ends 48 of the pin-supporting cords 22 in a counter-clockwise direction around the idler drum 36 away from the pins on the floor of the bowling lane until the cords are tensed and lift the pins from the floor; and as counter-clockwise rotation of the motor continues all the pins, fallen or standing alike, are lifted above the floor until they reach a predetermined level (FIGURE 10C) whereupon the operation of the motor is reversed to lower the pins that were left standing, in upright position into their predetermined locations upon the floor in the target area of the bowling lane in vertical alignment with the apertures 26 in the deck 10.

Figure 4:
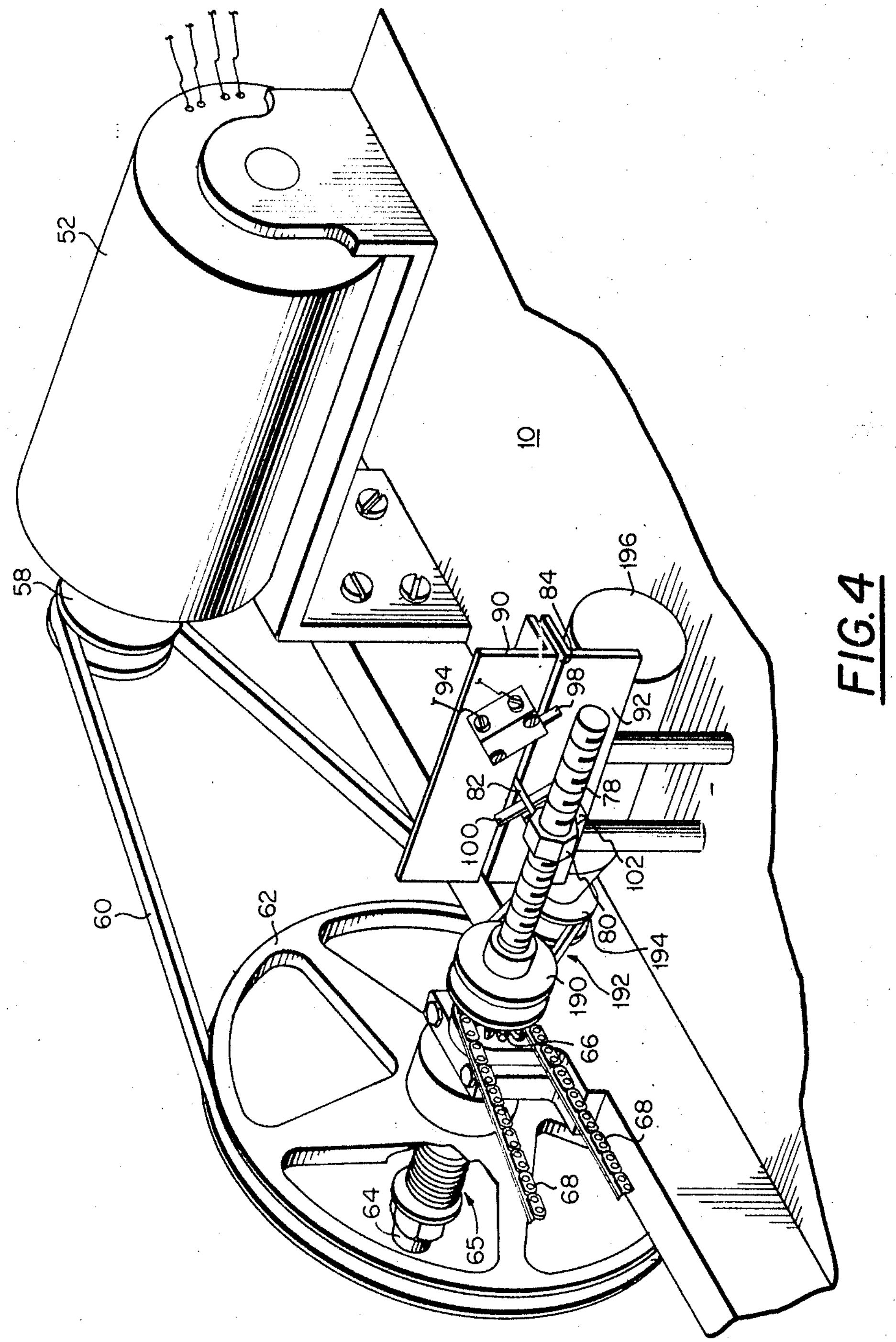
FIGURE 4 is a perspective of the power train from the motor to one of the drive drums comprised in the apparatus of the invention.

To initiate reversal in the operation of the motor 52 when the pins have reached a predetermined level with their tops located a limited distance below the deck 10, one end of the hereinbefore described shaft 64 is threaded to form a lead screw 78, and engaged upon said lead screw is a carriage nut 80 (FIGURE 4). Said nut is provided with a radially directed actuator rod 82 that slides in a guide way 84 which extends parallel to the axis of the lead screw and is formed by and between the vertically spaced horizontally disposed flanges of two L-shaped channels 90 and 92 respectively, that are suitably supported from the deck 10. Thus, the carriage nut 80 is held against rotation but is free to move in a direction axially of the lead screw 78. Hence, when the lead screw 78 is turned in a counter-clockwise direction, the carriage nut 80 moves forwardly upon said screw away from the pulley 62 mounted thereon, and when said screw turns in clockwise direction, said carriage nut 80 travels in the opposite direction.

Secured to the vertical flange of the upper channel member 90 is a switch 94 that lies in the control circuit of the starting winding 166 (FIGURE 13) of the motor 52, which determines the direction of rotation of the motor depending on the manner in which it connects said winding to the source of power. The switch 94 has an actuating arm 98 that extends across the guide way 84 formed by the horizontal flanges of the channels 90 and 92 into the path of the approaching actuator rod 82. When said arm 98 is contacted by said rod, the switch 94 effects such operation of the control circuit of winding 166 (FIGURE 13) as will effect reversal of the motor 52. This is first effective to brake counter-clockwise rotation of the motor and eventually initiates clockwise rotation thereof. As a result thereof, the drum 38 turns in a clockwise direction and winds up the drive cords 34 while unwinding them from the drum 40. This brings the points of connection 48 of the pin-supporting cords with the drive cords closer to the apertures 26 in deck 10 through which the pin-supporting cords pass, and as a result thereof the pin-supporting cords begin to lower their respective pins 16 onto the floor of the bowling lane. At the same time the carriage nut 80 commences to travel in the opposite, i.e. rearward direction as viewed in FIGURES 3 and 4, and its actuator rod 82 releases the switch arm 98 effecting deenergization of the direction-determining starter winding 166; but the motor once started in the opposite direction, continuous to turn in clockwise direction. When a sufficient length of the pin-supporting cords 22 has been paid out through the apertures 26 in deck 10 for the pins to reach and rest upon the floor of the bowling lane and for the pins to drop and roll along the floor of the lane under the impact of the ball without hindrance, the actuator rod 82 upon the carriage nut 80 encounters the actuating arm 100 of another switch 101 that is secured to the vertical flange of the lower channel member 92. In unactuated condition said switch 101 closes a control circuit of the running winding 162 of motor 52, and by engagement of the actuating rod 82 with switch arm 100, said circuit operates to disconnect the running winding from its power supply. Thus, the operation of the motor comes to a halt, with the pins 16 standing in their proper positions in the target area on the floor of the bowling lane, and with a sufficient length of cord available to permit them to fall and roll along the floor in their natural manner on the bowling lane.

Since the game of bowling affords a player usually the opportunity of throwing two balls at a set of pins, means must be provided in the described pin-setting apparatus for preventing the resetting of pins that were knocked over by the first ball. According to the present invention means are therefore associated with every pin-supporting cord which sense whether a pin has fallen by the pull exerted upon its cord when a pin is knocked over, and which activate mechanisms that prevent the cord of a fallen pin from lowering the pin during the pin-setting operation. For sensing whether a pin has been knocked down, every pin-supporting cord is initially looped around the sphere-shaped actuator 30 of the pin-position-sensing switch 32, as pointed out hereinbefore, and is arranged to operate said actuator whenever cord 22 is pulled in a downward direction indicative of the fact that its pin has been knocked over. Actuation of the switch 32 in housing 108 in turn is arranged to condition power paths for the energization of the pin-retaining mechanisms which have been identified by the reference numeral 28 hereinbefore and which grip the supporting cords of the pins that were knocked over and thus hold these particular pins suspended above the bowling lane when motor 52 is reversed to allow the elevated pins to descend upon the floor of the bowling lane.

Figure 5:
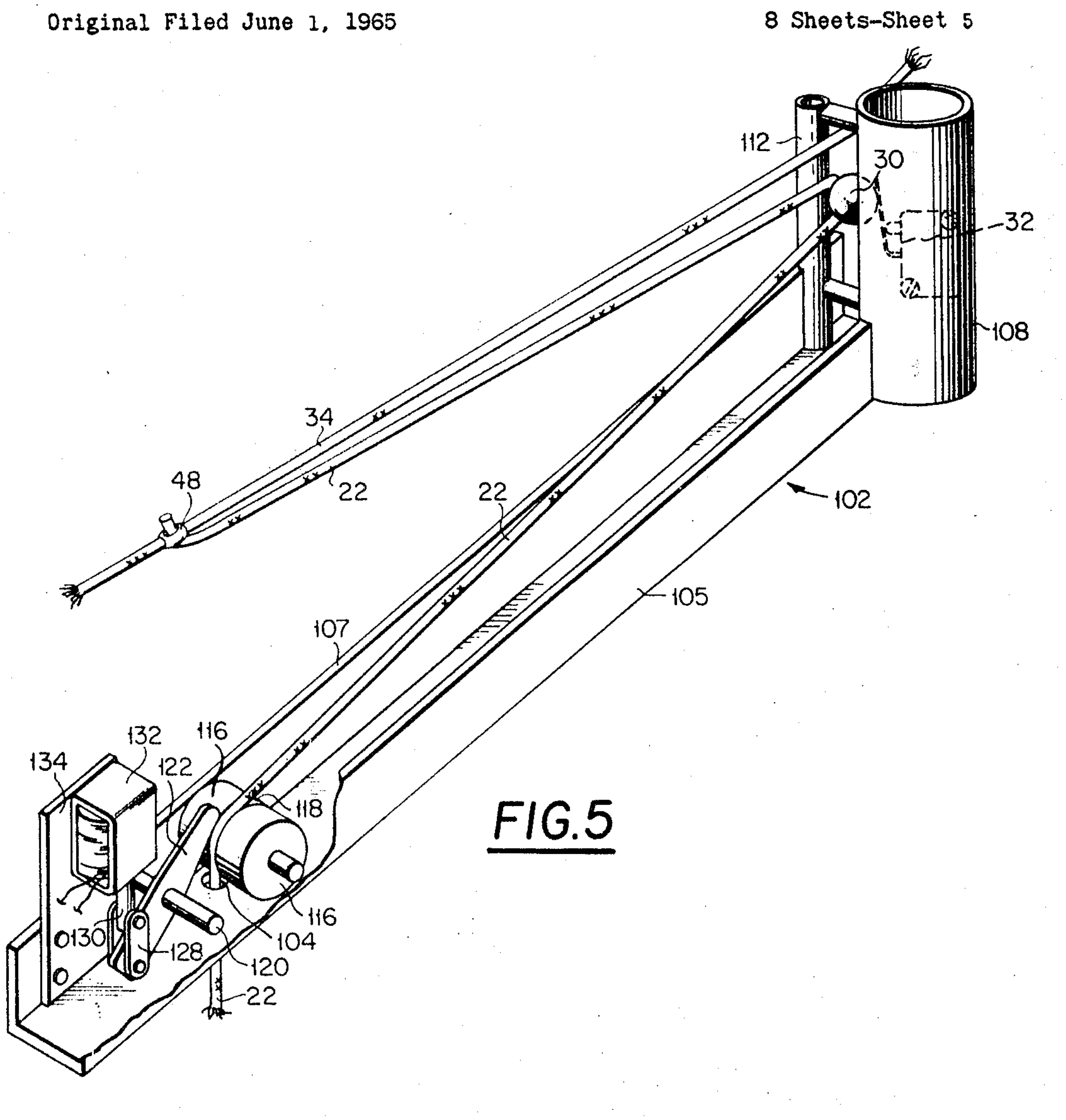
FIGURE 5 is a fragmentary perspective of the pin-retaining mechanism of one of the pins and of the pin-position-sensing switch that controls operation of said pin-retaining mechanism.
Figure 6:
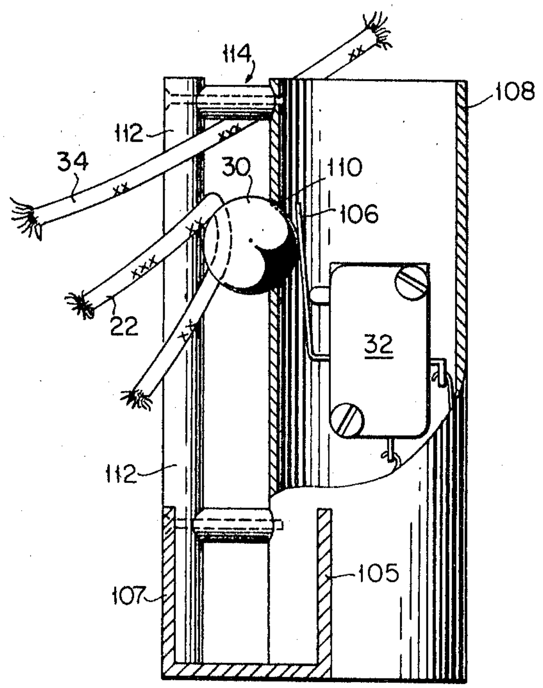
FIGURE 6 is a partly sectioned side elevation of the pin-position-sensing switch shown in FIGURE 5.

Having reference to FIGURE 1, every one of the drive cords 34 comprised in the apparatus of the invention is somewhat displaced in a direction transversely of the deck 10 from the aperture 26 in said deck through which its particular pin-supporting cord is threaded; and secured to the deck are U-channels 102 of substantial length, one for every pin, in such a position that they are disposed at a slight angle, longitudinally of the deck, with one of their ends located directly above the apertures 26 and the other located vertically below their respective actuator cords. Above its aperture 26 in deck 10, the bight portion of each channel 102 is provided with a registering aperture 104 (FIGURE 5) through which its particular pin-supporting cord passes. Suitably supported from a side flange 105 of each channel near the end thereof below its respective actuator cord is the hereinbefore mentioned sensing switch 32. Said switch has an upwardly directed operating arm 106 (FIGURE 6) and is encased in a tubular housing 108 that is mounted upon the flange 105. At the level of arm 106 the tubular housing 108 is provided with a circular aperture 110, and a tubular post 112 is mounted upon the other flange 107 of the channel 102 opposite the housing 108. Engaged in the aperture 110 and loosely held between said post 112 and the resiliently yieldable arm 106 of switch 32 is the hereinbefore mentioned sphere-shaped actuator 30. The drive cord 34 with which the switch 32 is associated, passes through the space between the tubular housing 108 and the post 112, and to confine the cord 34 to the described location, a cross beam 114 is provided above and across the cord 34 between housing 108 and post 112 near the upper ends thereof. Initially, when the pins are in their proper position upon the floor of the bowling lane, the pin-supporting cords 22 are trained underneath and around the spheres 30 (FIGURES 5 and 6) and their connections 48 with their respective actuator cords 34 are located above the aligned apertures 26 and 104 in the deck 10 and channel 102, respectively, through which they pass (FIGURES 5 and 10); and due to the oblique position of the mounting channels 102 with respect to the drive cords 34, matters can be arranged so that the loops of the pin-supporting cords 22 about the sphere-shaped actuators 30 will always automatically position themselves above the segments of said actuators adjacent the posts 112. When a pin is knocked over, however, it pulls its cord 22 through the space between the post 112 and the adjacent segment of sphere 30 causing said sphere to actuate briefly the arm 106 of switch 32. This brief actuation of the switch is arranged to condition the power circuit of the pin-retaining mechanism 28 at the other end of the channel 102 for brief energization when operation of the motor is reversed to lower the pins, after all the pins have been lifted above the floor of the lane.

Figure 7A:
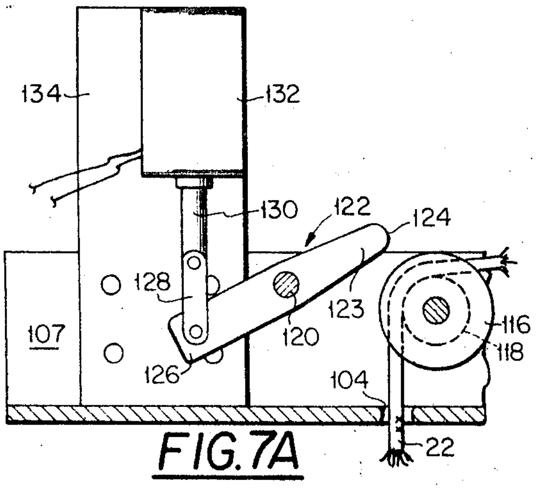
FIGURES 7A and 7B are partly sectional side elevations of the pin-retaining mechanism shown in FIGURE 5, illustrating different operational positions thereof.
Figure 7B:
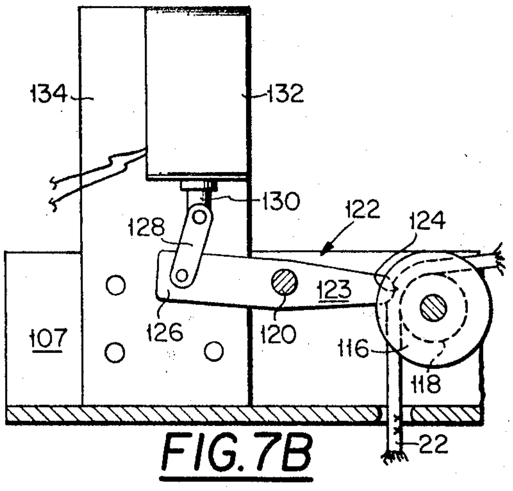
Figure 9A:
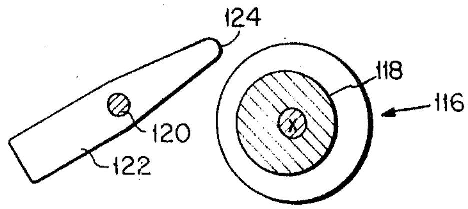
FIGURES 9A and 9B are vertical sections taken along line 9—9 of FIGURE 8 illustrating modifications of a component of the pin-retaining mechanism.
Figure 9B:
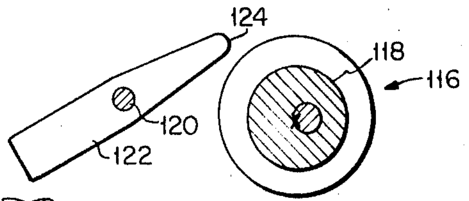
Figure 8:
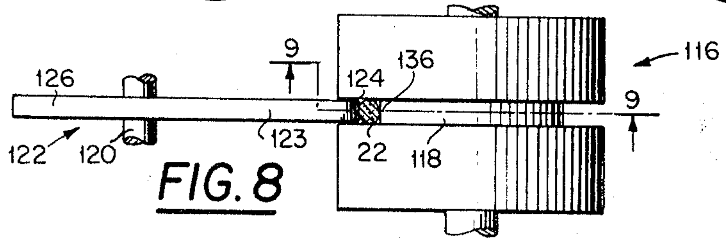
FIGURE 8 is a fragmentary plan view of the mechanism shown in FIGURES 7A and 7B.

Each pin-retaining mechanism 28 comprises a roller 116 that is rotatably supported by and between the flanges 105 and 107 of the channel 102 adjacent the registering apertures in the bight portion of the channel and the deck and each pin-supporting cord 22 is trained around such a roller and engages a center groove 118 provided in the cylindrical surface thereof. Rotatably supported between the flanges 105 and 107 of channel 102 on the other side of aperture 104 by means of a shaft 120 is a lever 122 with its axis of rotation preferably located at a slightly higher level than the axis of rotation of the roller 116. One arm 123 of said lever 122 is tapered and has a rounded end 124, and it is of such length that its end 124 may be brought into engagement with the groove 118 in roller 116 but does not reach the floor of said groove (FIGURE 8). The opposite arm 126 of said lever is pivotally connected by a linkage 128 to the end of the normally downwardly projected armature 130 of a solenoid 132. The solenoid is supported from the flange 107 of channel 102 by means of a suitable mounting plate 134 at a level above the lever 122 and the roller 116; and when it is in deenergized condition, its downwardly projected armature 130 holds the lever 122 in a counter-clockwise position as viewed in FIGURES 5, 7A and 7B wherein its rounded nose 124 is upwardly withdrawn from the groove of the roller 116 (FIGURE 7A). When the solenoid 132 is energized, however, and pulls the rear arm 126 of the lever 122 upwardly in clockwise direction, the nose of the lever swings likewise in clockwise direction and enters from above into the groove 118 in roller 116, and its tip presses the cord 22 against the floor 136 of the groove 118 so that the cord is held pinched between the nose 124 of the lever 122 and the floor 136 of the groove 118 (FIGURE 8), making it impossible for the pin at the bottom end of the cord to be lowered (FIGURES 7B and 8). By making the arm 123 of the lever 122 of such length that its nose 124 may negotiate the groove 118 in roller 116 when the cord is not present, but cannot clear the groove when a cord is engaged in said groove, the described pin-retaining mechanism may be made to be self-locking, i.e. the pull on the cord by the weight of the pin and the frictional engagement of the cord with the nose 124 of the lever will continue to hold the nose of the lever in such a position relative to the floor of the groove of roller 116 as will prevent passage of the cord and lowering of the pin even after the solenoid 132 has been deenergized; and it will in fact require an upward pull upon the cord 22 before the described cord-pinching device releases its hold upon the cord and the pin at its bottom end may be lowered. It is for this reason that even a very weak solenoid will suffice to activate the pin-retaining mechanism of the invention. We have found the described cord-pinching mechanism to be particularly effective when the groove 118 has a slight eccentricity with regard to the axis of rotation of the roller 116 (FIGURE 9A) and/or when the roller 116 itself is mounted for rotation about a slightly eccentric axis (FIGURE 9B).

Figure 11:
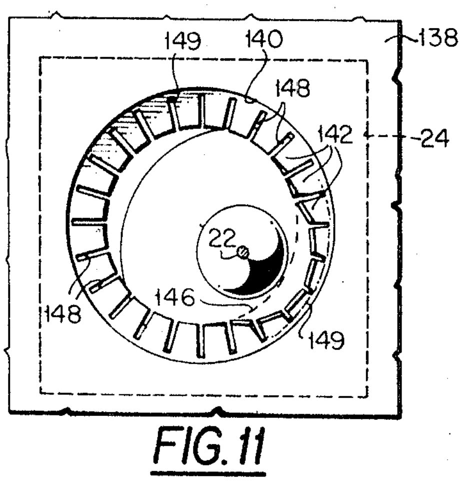
FIGURE 11 is a plan view of a pin-centering arrangement showing a pin passing therethrough.
Figure 12:
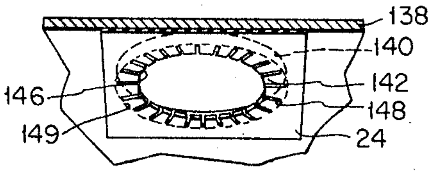
FIGURE 12 is a perspective of the pin-centering arrangement viewed from a point below.

When the pins are lifted from the floor of the bowling lane by their strings, they have a tendency to swing, especially those which were knocked over and, therefore were no longer located vertically below the apertures 26 in deck 10. Means are therefore provided in accordance with the invention that stabilize and center the pins near the end of their upward journey in each pin-resetting operation so that they may dependably be lowered into their proper positions on the floor of the bowling alley when operation of the pin-lifting motor is reversed. Having reference to FIGURES 1 and 2, a distance below the upper deck 10 less than the height of the pins, the legs 12 of the apparatus support a lower deck 138, and provided in said lower deck in axial alignment with the apertures 26 in the upper deck and the proper pin positions, on the floor of the bowling lane are circular openings 140 which are larger in size than would be necessary to clear the pins (FIGURE 12). Arranged to protrude into the openings 140 from the periphery thereof are coronets of tongues or prongs 142 of a resiliently yieldable sheet material, such as sheets of natural or synthetic rubber (FIGURE 11). In the embodiment of the invention illustrated in the accompanying drawings these stabilizing devices are formed by square frames 24 of synthetic sheet rubber that are secured to the underside of the lower deck 138 around the openings 140. These frames have circular openings 146 that are of lesser diameter than the widest circumferential circle of the pins, and they are arranged concentrically with said openings 140 in said lower deck. Provided along the edges of said openings are radial slots 148. Said slots 148 reach to a circle 149 which is of a slightly greater diameter than the largest diameter of the pin and may be of the same or a somewhat smaller diameter than the diameter of the openings 140 in deck 138. Said slots 148 establish the above described tongues or prongs 142 that project into the space defined by the openings 140 in the lower deck 138. When a pin is lifted by operation of the motor 52 and its neck enters the center opening 146 in a frame 24, its body comes against and deforms the resiliently yieldable tongues 142 (FIGURE 11) and said prongs in turn dampen any swinging movement of the pins and because of their resiliency they finally center them properly directly above the areas of the floor upon which they are to be lowered.

It will be understood that other devices may be employed in the pin-setting apparatus of the invention, for stabilizing the pins and their cords and for centering them over their proper places upon the floor of the bowling lane as they are being raised and lowered.

Control circuitry and operation

Figure 13:
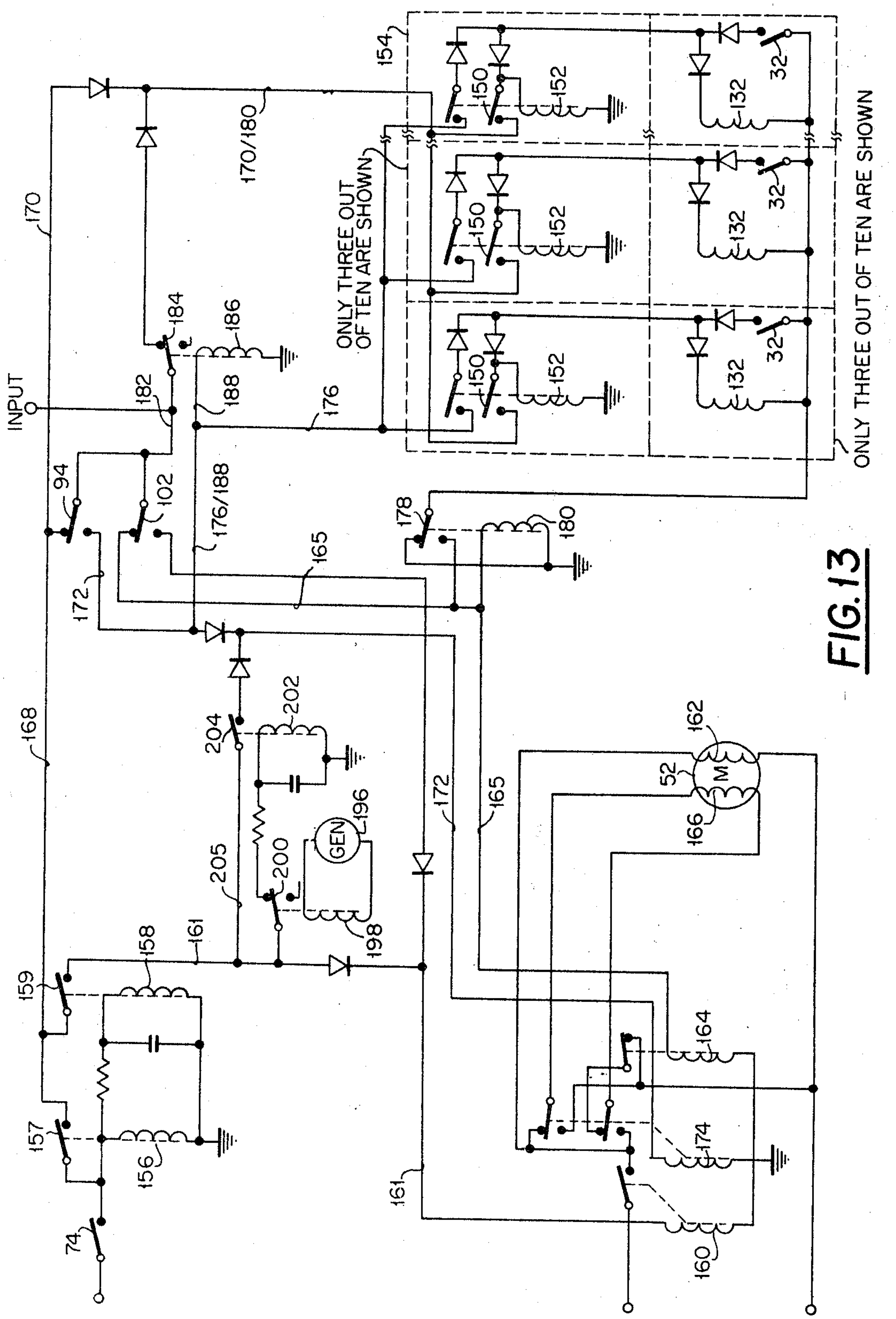
FIGURE 13 is a diagram of an electric control system for the pin-setting apparatus of the invention.

Initially, when the pins are in their proper position upon the target area of the bowling lane, all the pin-supporting cords 22 are in the position illustrated in FIGURES 2, 3, 6 and 10A, i.e. they are looped around the actuator spheres 30 of their respective pin-position-sensing switches 32 and their connections 48 to their actuator cords 34 are preferably located above the registering apertures 26 and 104 in the deck 10 and the channels 102, respectively. When a pin is knocked over, its weight pulls its cord 22 past the actuator spheres 30 of its respective pin-position-sensing switch 32 and briefly actuates said switch (FIGURE 10B). Actuation of the switch 32 renders conductive a normally non-conductive link in the power path of the solenoid 132 of its corresponding cord retaining mechanism 28. In FIGURE 13 said links are initially open switches 150 that are closed by energization of self-latching electromechanical relays 152 which are energized by the brief closure of the pin-position-sensing switches 32. All the ten normally non-conductive links or switches 150 and the relays 152 comprised in the apparatus of the invention, one for each pin 16, constitute in fact a memory which is symbolized by the box 154 in FIGURE 13 and which registers in response to actuation of the pin-position-sensing switches 32 which of the pins have fallen in the first frame of the game.

To avoid that the pin-supporting cords hold up a tottering pin or interfere otherwise with the movement of the pins under the impact of a thrown ball, it is evidently desirable that the pin-supporting cords be of sufficient length to permit free movement of the pins under the impact of a ball, and yet the arrangement must be such that the cords actuate the position-sensing switches 32 immediately whenever an adequate pull is exerted upon them. This achieved by training the pin-supporting cords loosely around the actuator spheres 30 of the position-sensing switches 32 at points that are relatively remote from the apertures 26 and 104 in the deck 10 and channels 102 respectively, and by making said pin-supporting cords of such length that when they are looped around the actuator spheres 30 of the sensing switches, their connections 48 with the actuator cords are located directly above said pin-position determining apertures 26 and 104 in the deck 10 and the channels 102. Thus, when a pin falls, its cord actuates the sphere of its position-sensing switch immediately, and once the cord has passed between the sphere and the post 112 of the sensing switch, a length of cord about equal to twice the distance between the aperture 104 in channel 102 and the actuator sphere 30 is immediately available for the falling pin so that it may roll to the the very end of the actuator cords 34 in a direction transversely of the deck relative to the apertures 26 in said deck through the bowling lane; and due to the displaced location of which their pin-supporting cords pass, the loops of said pin-supporting cords about the actuator spheres of the pin-position-sensing switches 32 locate themselves naturally in their proper positions about the segments of said spheres adjacent the posts 112 where they may readily pass while operating the actuator spheres even when only a relatively slight pull is exerted upon them.

When the ball strikes the gate 72 at the end of the bowling lane (FIGURE 2), the switch 74 is briefly closed. Closure of switch 74 is arranged to energize a self-latching relay 156 which is intended to preserve the impulse provided by the actuation of the switch 74. Activation of the self-latching relay 156 is arranged to close a normally open switch 157 and energize a second self-latching relay 158 which is of the delayed response type and which operates to close a switch 159 to deliver power along a line 161 to the control relay 160 for the running winding 162 of the motor 52 after sufficient time has elapsed for the pins to come to rest. At the beginning of each cycle in the operation of the apparatus when the pins are on the floor of the bowling lane, the actuator rod 82 on the carriage nut (FIGURE 4) engages the arm of the hereinbefore described switch 101 and maintains said switch in a condition wherein power is supplied along a line 165 to a control relay 164 in the control circuit of the direction determining starter winding 166 (FIGURE 13). Energization of the relay 164 is arranged to supply power to the starter winding 166 in a manner that is effective to start operation of the motor in a "pin-raising" direction provided the running winding 162 of the motor is energized.

Hence, as soon as closure of the switch 159 controlled by the delayed response relay 158 effects energization of the control relay 160, and hence, of the running winding 162 of the motor 52, said motor starts operation in an "upward" direction, i.e. in a direction which winds the actuator strings 34 upon the drum 40 and lifts the pins above the floor of the bowling alley.

As soon as the motor begins to operate, the carriage nut 80 on the lead screw 78 (FIGURE 4) begins to travel forwardly as viewed in FIGURES 1 and 4, and its actuator rod 82 releases the arm of switch 101 permitting said switch to return to its normal non-actuated position. Return of said switch to its non-actuated position deenergizes the relay 164 which started the motor in an "upward" direction. In addition, return of the switch 101 to its non-actuated position closes a second power supply through control relay 160 of the running winding 162 of the motor so that the motor depends for operation no longer upon the power supply controlled by the latch and time delay circuitries 156 and 158. After the pins suspended from the cords 22 have all entered, and been stabilized in, the centering devices 140 and reach a predetermined level below the deck (FIGURE 10C), the carriage nut 80 in its forward travel on the lead screw 78, brings its actuator rod 82 against the arm of switch 94 and actuates said switch. Switch 94 is a two-way switch which is normally in a position wherein it supplies the necessary power through a line 168 to the latch and time delay circuitries 156 and 158 and through a line 170 to the memory unit 154. When the arm of switch 94 is actuated in the described manner at the end of the upward travel of the pins the supply of power to the latch and time delay circuitries is interrupted and said circuitries return to inactive positions. The running winding of the motor, however, remains supplied with power due to the above described release of the arm of switch 102 at the beginning of the "upward" operation of the motor. Actuation of the arm of switch 94 by the rod of the carriage nut 80 has the added effect of applying power through a line 172 to a relay 174 in the control circuit of the starter winding 166. Energization of the relay 174 is arranged to apply power to the starter winding in a manner effective to reverse operation of the motor. The described energization of the starter winding acts first as a dynamic brake upon the motor and eventually reverses its operation so that the drums 38 and 40 turn in the opposite direction and the pins on cords 22 begin to drop.

The actuation of the arm of switch 94 by the actuator rod 82 of the carriage nut 80 at the end of the upward travel of the pins, however, is not only arranged to apply a motor reversing power pulse to the control circuitry of the starter winding of the motor, it also applies power through a branch line 176 of line 172 and the pin position memory 154 of the apparatus to the solenoids 132 of the ten cord-pinching pin-retaining mechanism 28. As described hereinbefore, the memory 154 is constituted by ten initially open switches 150 that are arranged in parallel and lie in the power circuits of the ten solenoids 132; and wherever said switches 150 were closed and latched in closed condition by energization of the self-latching relays 152 as a result of actuation of a pin-sensing switch 32, the above described actuation of the top limit switch 94 effects energization on their respective solenoids 132 causing the noses 124 of the levers 122 to engage and press the pin-supporting cords against the bottom of the groove 118 in rollers 116. Hence, when rotation of the drums 38 and 40 is reversed, the particular pins remain suspended directly below the deck 10 and continue to do so on account of the described self-locking action of the cord-pinching mechanism 28, even after continued "downward" operation of motor effects release of the arm of switch 94 and the temporarily energized solenoids 132 return to deenergization condition. The other pins, however, continue to lower until they reach their proper positions upon the floor of the bowling lane in the target area thereof. At this time the actuator rod 82 on the carriage nut 80 engages the arm of switch 101 and interrupts the power supply to the control relay 160 of the running winding 162 of the motor causing the motor to come to a halt. The pins that were not knocked over by the first ball, stand now in their proper positions on the floor of the lane, and the "fallen" pins are suspended close to the deck 10 and therefore removed from the lane and out of reach of the second ball. Return of the switch 94 to its initial position, with its arm released by the actuator rod 82 is also effective to restore sustaining power through line 168 to the gate-switch controlled latch and time delay circuitries 156 and 158 and to interrupt the power path to the relay 174 which effects "downward" energization of the starter winding 166. The apparatus of the invention is, therefore, ready for the second ball of the frame.

Means may be provided in the described control circuitry of the pin-setting apparatus that prevent closure of the memory switches 150 by accidental actuation of the pin-position-sensing switches 32 once operation of the motor has started. For this purpose the parallel power circuits for the memory relays 152 (which circuits contain the pin-position-sensing switches 32) include a normally open switch 178 that is initially held in closed position by energization of a relay 180. Said relay is supplied with power from the same line 165 that supplies power to the relay 164 which effects energization of the starter winding 166 of the motor in a manner effective to initiate "upward operation" of said motor. Said line 165 is connected to the source of power by the repeatedly mentioned switch 101 when said switch is engaged by the actuating rod 82 of the carriage nut 80 before the motor commences operation. When the motor begins its "upward" operation, however, the rod 82 releases the switch 101 effecting interruption of the power line 165. The resultant deenergization of the relay 180 permits the switch 178 to interrupt the power line to the memory relays 152 so that thereafter accidental actuation of the pin-position-sensing switches 32, such as may be effected by the swaying of the cords during upward movement of the pins, remains without effect upon the pin memory.

When the second ball of a frame has been thrown, the hereinbefore described control operations are repeated. Some or all of the remaining pins may fall and actuate their position-sensing switches 32 which close and latch the memory switches 150 in the power circuits of the solenoids of their cord-pinching mechanisms 28. However, closure of the memory switches is of no significance during further operation of the apparatus in the second phase of the frame as will presently appear. Movement of the gate plate 72 under the impact of the second ball actuates the switch 74 which initiates "upward" operation of the motor pulling all the pin-supporting cords upwardly through the registering apertures in the deck 10 and the channels 102, respectively. In the case of the pins that took part in the second phase of the frame, this has the effect of lifting all of them above ground whether they were knocked over or were left standing, and in the case of the pins that were suspended above ground during the second phase of the frame this has ultimately the effect of breaking the self-locking interaction between the pinching lever 122 and the cords in the grooves 118 of the rollers 116 of the pin-retaining devices. As a result thereof, the pinching levers 122 may all return to their raised positions under the effect of the weight of the projected armatures of their deenergized solenoids 132 upon the rear arm 126 of said levers.

The counter-clockwise movement of the actuator cords 22 as viewed in FIGURES 2 and 3, as effected by the "upward" operation of the motor 52, has the added effect of returning the pin-supporting cords of fallen pins through the interstices between the actuator spheres 30 and the posts 112 of the sensing switches 32 to their initial positions relative to said spheres 30 and said posts 112 respectively, wherein they loop themselves loosely about the spheres adjacent said posts when "downward" operation of the motor returns the pins to their proper positions upon the floor of the bowling lane. Hence, the pin-supporting cords of previously fallen pins are again in their proper positions for immediate action upon the actuator spheres 30 of the pin-position-sensing switches 32.

In order that all pins, whether they were left standing or have fallen, may be reset into their proper positions upon the floor of the bowling alley after the second ball has been played, means must be provided that disables the pin-position memory 154 during each second operational cycle of the apparatus so that none of the pin-retaining mechanisms 28 may be energized. The performance of the ten parallel arranged relay-operated switches 150 that constitute the memory 154 of the apparatus of the invention, requires the continuous application of power to the relays 152 to maintain the closed switches in latched condition. In the embodiment of the invention illustrated in FIGURE 13 this power is supplied along two lines. One is the hereinbefore mentioned line 170 which contains the repeatedly mentioned switch 94 adjacent the front end of the lead screw 78 in its non-actuated condition. The other one is identified by the reference number 182 and contains an initially closed switch 184 that is actuated by a flip-flop relay 186. Flip-flop relays are well known in the art. They are of such construction that their armature will not alter the position of the switch which they control when the relay is energized, but will alter the position of the switch when it returns to its position of rest upon deenergization of the relay. The energization of the relay 186 is controlled by a branch line 188 of the repeatedly mentioned power line 172 which contains the top limit switch 94 and which is energized when said switch 94 is actuated by the rod 82 of the carriage nut 80 as the pins reach their uppermost positions.

During both cycles or phases of a frame in the operation of the apparatus of our invention the first power branch 170 leading to the memory 154 remains closed except for the brief interval when the carriage nut 80 at the end of its travel upon the lead screw 78 actuates the switch 94 to effect a reversal in the operation of the motor and to send power through the line 176 to the solenoids 132 of the cord-pinching mechanisms 28 whose memory switches 150 have been closed. The flip-flop relay 186 is arranged to leave the flip-flop switch 184 closed during the first cycle of each frame and to keep it open during the second cycle of the frame. Having reference to FIGURE 13, when the top limit switch 94 is actuated during the first cycle of a frame, the resultant energization of the flip-flop relay 186 remains temporarily without effect upon the position of the flip-flop switch 184. Hence, during each first phase or cycle in the operation of the apparatus, the memory relays 152 remain at all times supplied with sustaining power because when the switch 94 is actuated at the end of the "upward" operation of the motor 52 and breaks the supply of power through line 170, power reaches the memory relays through the line 182 and the closed flip-flop switch 184.

When the top limit switch 94 returns to its non-actuated condition, however, as the pins begin to descend, the resultant deenergization of the flip-flop relay 186 is effective to open the switch 184 in line 182. Hence, in the second cycle in the operation of the apparatus, when the rod 82 on the carriage nut 80 actuates the arm of switch 94 again to effect reversal of the motor, all the power is cut off from the memory relays 152. As as result thereof, the relays 152 release the latched memory switches 150 and the memory is cleared; and when actuation of the switch 94 by the rod 82 on the carriage nut 80 closes briefly the power bath 172/176 to the solenoids of the pin-retaining machanism 28, the memory switches 150 are all open and all the solenoids 132 comprised in the apparatus of the invention remain idle. Reversal of the motor, therefore, lowers all the pins into their proper positions upon the floor of the bowling alley in the target area thereof; and re-application of power to the memory relay 152 upon return of the switch 94 to its non-actuated position reconditions the memory for effective operations during the subsequent first ball of a new frame. Return of the switch 94 to its non-actuated position has the added effect of causing deenergization of the flip-flop relay 186 which is effective to return the flip-flop switch 184 to closed position.

When the pins are knocked over and roll on the floor of the lane in different directions under the impact of a ball, it may happen that they change their positions relative to each other in such a manner that their cords 22 become entangled when they are pulled upwardly by the subsequent operation of the pin-setting motor. Means are provided in accordance with our invention that sense any entanglement of the pins and their cords and which modify the operation of the pin-resetting apparatus in a manner that is likely to effect disentanglement of the pins and their cords.

Having reference to FIGURE 4, the power train from the output shaft of motor 52 to the drums 38 and 40 which move the drive cords 34, contains a slip clutch 65 as has been pointed out hereinbefore. In the particular embodiment of the invention illustrated in the accompanying drawing said slip clutch is interposed between the pulley 62 and the shaft 64 whose front end is converted into a lead screw 78 as previously described. Secured to said shaft is a pulley 190 which is operatively connected by an endless belt 192 to another pulley 194. Said pulley 194 is firmly mounted upon the input shaft of an electric generator 196 that may be supported upon the deck 10 of the apparatus. As long as in raising the pins from the floor, the power train from the motor to the drum 40 encounters no undue resistance, the generator 196 is driven by its belt connection 192 with the pulley 190 and produces an output. When the "upward" operation of the motor encounters undue resistance, however, which is indicative of an entanglement of the cords of the pins as they are being raised, the slip clutch 65 suspends operative connection between the pulley 62 and the shaft 64 and rotation of the generator 196 comes to a halt. In accordance with the invention, the disappearance of an output from the generator 196 is arranged to reverse the operation of the motor causing it to lower the partly rasied pins to the floor; and after the pins have been lowered to the ground, actuation of the repeatedly mentioned switch 101 as the rod on the carriage nut 80 bears against its actuating arm upon descent of the pins to the floor, is arranged to cause the motor to resume its "upward" operation provided the running winding 162 of the motor remains supplied with power under control of the latch and time delay circuitries 156 and 158, as it does when the motor is reversed before the pins reach their topmost positions.

Having again reference to FIGURE 13, the output of generator 196 is applied across relay 198. When energized, the relay 198 operates to hold open a normally closed switch 200 in the power circuit of a delayed reaction relay 202. When operation of the generator comes to a halt, and the relay 198 is deenergized, the switch 200 is permitted to close and effects energization of the relay 202 after a brief predetermined period of time has elapsed. Energization of the relay 202 is effective to close a normally open switch 204 in an auxiliary power circuit 205 for the relay 174 that controls "downward" energization of the starter winding 166 of the motor. As a result thereof, the "upward" operation of the motor is braked and it is eventually reversed so that the partially raised pins are lowered to the floor. Due to the fact that the relay 202 is of the delayed reaction type, there is sufficient time upon actuation of switch 159 of relay 158 for the motor to commence "upward" operation and for the generator 196 to produce an output that disables the power supply to the relay 202 before said relay 202 can operate to establish the auxiliary power path 205 to the relay 174 whose energization initiates "downward" operation of the motor 52. Hence, reversal of the motor cannot occur until its operation has lifted the pins a limited distance above the ground.

With the generator 196 being operated in the reverse direction, it produces again an output which energizes the relay 198 and opens the switch 200 in the power circuit of the delayed response relay 202. As a result thereof, the relay 174 which initiates the "downward" operation of the motor is again disabled. The motor continues its reverse operation, however, until the pins reach the floor of the bowling lane and the actuator rod 82 on the carriage nut 80 re-engages the operating arm of switch 101 throwing said switch into a position wherein power is applied to the control relay 164 for the motor starter winding 166, that initiates "upward" operation of the motor. Since the pins never reached their top-most position before their movement was reversed and the rod 82 on the carriage nut 80, therefore, never reached a position in which it actuated the switch 94, the power supply 161 to the running winding control relay 160 of the motor under control of the latch and time delay circuits 156 and 158 is still in effect. As a result thereof, the motor reverses its direction of movement again and operates to lift the pins again from the floor of the bowling lane.

If resistance develops again to the upward movement of the pins and the slip clutch 65 again suspends operation and causes the output from the generator 196 to disappear, the above described occurrances in the control circuitry of the motor repeat themselves and cause reversal in the operation of the motor with the result that the pins are again lowered onto the floor and are again raised from the floor; and this sequence of events continues until the pins and their cords have entangled themselves and the pins may be raised to their top positions without placing an undue strain upon the slip clutch 65. When this occurs, the apparatus of the invention resumes its normal pin-lowering operation and sets the proper pins into their appropriate positions upon the floor of the bowling lane.

While we have explained our invention with aid of a practical embodiment thereof, it will be understood that the invention is not limited to the the specific constructional details or specific control circuitries described and shown by way of example, which may be departed from without departing from the scope and spirit of the invention. For example; transistorized and/or solid state components may be substituted for relay logic circuitry. Thus, it will be obvious to those skilled in the art that many different control circuitries may be devised that operate in the required manner.

We claim:

1. For pin setting apparatus of the type having pins suspended from cords, a pin-position-sensing arrangement comprising a drive cord for the pin, a pin-supporting cord having a pin suspended from its lower end and having its upper end secured to said drive cord, a housing located on one side of said drive cord and having an opening in the side facing said drive cord, a switch having an actuating arm extending across said opening within said housing, a retaining member located on the side of said drive cord opposite said opening, and a rounded body held in said opening between said member and said actuating arm, said pin-supporting cord extending from said upper secured end to said member and said housing, over and around the point of contact between said member and said body, to said lower end.

2. A pin-position-sensing arrangement according to claim 1 wherein said opening in said housing is circular and said rounded body is a sphere.

3. In pin setting apparatus for bowling lanes, of the type having pins suspended from cords, a pin-position-sensing arrangement comprising a roller above the area of the bowling lane where a pin is to be set up, a drive cord for the pin having a run extending above said roller, a pin-supporting cord trained over said roller and having a pin suspended from its lower end, a housing located on one side of said drive cord run at a point remote from said roller and having an opening in the side facing said run, a switch located in said housing and having an actuating arm extending across said opening, a retaining member located on the opposite side of said run, and a rounded body held in said opening between said member and said actuating arm, said pin-supporting cord extending from said roller to said member and said housing, around the point of contact between said member and said body, and having its upper end connected to said drive cord run at a point above said roller.

4. A pin-position-sensing arrangement according to claim 3 wherein said opening in said housing is circular and said rounded body is a sphere.

5. A pin-position-sensing arrangement according to claims 3 or 4 wherein said pin-supporting cord has its upper end connected to said drive cord run at a point vertically above said roller when said drive cord is in its initial position with its pin located upon the floor of the bowling lane.

References Cited

UNITED STATES PATENTS

| | | | |
|---|---|---|---|
| 1,263,875 | 4/1918 | Fekete | 273—44 |
| 2,187,575 | 1/1940 | Schroder | 242—148 X |
| 3,090,619 | 5/1963 | Plant | 273—44 |

ANTON O. OECHSLE, Primary Examiner

U.S. Cl. X.R.

188—64; 200—61.13; 242—148; 318—475